United States Patent [19]

Burdick

[11] Patent Number: 5,533,849
[45] Date of Patent: Jul. 9, 1996

[54] SELF-LOCKING NUT FOR A WHEEL BEARING

[75] Inventor: Robert A. Burdick, Burbank, Calif.

[73] Assignee: Hi-Shear Corporation, Torrance, Calif.

[21] Appl. No.: 275,834

[22] Filed: Jul. 15, 1994

[51] Int. Cl.[6] .............................. F16B 39/10; F16B 39/24
[52] U.S. Cl. ............................ 411/120; 411/121; 411/150
[58] Field of Search ....................................... 411/111, 120,
411/121, 134, 135, 138, 150, 956, 964

[56] References Cited

U.S. PATENT DOCUMENTS

| | | |
|---|---|---|
| 292,513 | 1/1884 | Shailer ................................... 411/150 |
| 324,174 | 8/1885 | Shailer ................................... 411/150 |
| 3,581,609 | 6/1971 | Greenwood . |
| 3,851,690 | 12/1974 | Wing et al. . |
| 4,534,101 | 8/1985 | Rosan, Jr. ............................... 411/150 |
| 4,812,094 | 3/1989 | Gruge ..................................... 411/134 |
| 4,971,501 | 11/1990 | Chavez . |
| 5,180,265 | 1/1993 | Wiese . |
| 5,362,111 | 11/1994 | Harbin ............................... 411/121 X |

*Primary Examiner*—Neill R. Wilson
*Attorney, Agent, or Firm*—Donald D. Mon

[57] ABSTRACT

A self-locking nut for application to a threaded shaft, especially a wheel bearing nut. The shaft has a spline groove along its thread. A cup-like thrust washer fits on the shaft with a tang in the spline grove to prevent its rotation. It has retention grooves in its wall. A lock ring is slidably retained in the washer with tangs in the retention grooves. A bias spring is fitted between the washer and the lock ring. An internally threaded nut is threaded to the shaft and has a depending neck passing through the lock ring having a bearing surface to bear against the washer, and an outward deformation which prevents removal of the nut from the lock ring.

4 Claims, 3 Drawing Sheets

SELF-LOCKING NUT FOR A WHEEL BEARING

FIELD OF THE INVENTION

A self-locking nut for a wheel bearing nut which can be installed on a shaft with conventional tooling, and when the correct torque is applied, the tooling can be removed and the nut will lock itself to the shaft.

BACKGROUND OF THE INVENTION

Self-locking wheel nuts are known in the art. They are applied to a splined shaft and tightened down to hold a wheel bearing in place. They are tightened to a known torque, and when the torque tool is released, the nut will lock itself to the shaft.

Such nuts must be very reliable because of their function in retaining the wheels of the vehicle. Their failure can result in very serious consequences. This consideration cannot accommodate any compromise.

Within the bounds of reliability there are other important considerations which will determine which of a number of different safe nuts will receive the order. One is cost, where the saving of only a few cents on each nut amounts to many dollars when multiplied by the millions of such nuts which are used annually. A nut according to this invention can be made from affordable materials with established manufacturing procedures and equipment. While its cost may be somewhat larger than other known nuts having this same ultimate function, its other advantages more than justify a substantial price difference.

One advantage is the speed of installation. Many self-locking nuts must be installed from start to finish with specialized tooling, requiring time measured in minutes. The nut according to this invention can utilize conventional sockets, modified only with a peripheral skirt of proper lengths. It can be installed in about 20 seconds because it can be freely spun onto the shaft without using the tool which speeds the procedure. The tool is needed only for the final tightening.

Yet another advantage is lightness of weight for this unsprung vehicle element. This nut needs only four parts, several of which are quite light.

It is the object of this invention to provide a very reliable self-locking nut which is quick and easy to install, which has only four parts, which requires only conventional tooling for installation, which is light in weight, and whose cost is very competitive, especially in view of its attendant advantages.

BRIEF DESCRIPTION OF THE INVENTION

A self-locking nut according to this invention is intended to be applied to a threaded shaft. The shaft has an axially extending spline groove along its threads. A thrust washer has a central opening to pass the shaft, and a spline tang extending into the opening. The spline tang fits in the spline groove and prevents the thrust washer from rotating around the shaft.

The thrust washer includes an abutment face adapted to bear against a surface such as a bearing race, and a bearing face facing away from it. A peripheral shoulder forms the thrust washer into a cup-like body, with an internal peripheral wall that forms an internal cavity. The wall is periodically enlarged to form a plurality of axially-extending retention grooves. The peripheral wall has an upper edge spaced from the bearing face.

A bias spring is seated in the cavity, extending around the opening. It bears against the bearing face. A lock ring is fitted in the cavity. It includes a plurality of retention tangs which fit into the retention grooves to prevent the lock ring from turning in the thrust washer. Portions of the upper edge of the peripheral wall are staked over at the top of the grooves to retain the lock ring in the cavity.

The lock ring has a bias face against which the bias means bears. The lock ring, bias means, and thrust washer constitute a loosely assembled group of three parts, which cannot be separated, and in which the lock ring cannot be rotated relative to the thrust washer.

The lock ring further includes radially extending lock grooves on its upper face. An internally threaded nut has a depending neck fitted in a central opening in the lock ring. It has downwardly facing radial grooves matching and facing those on the lock ring. A bearing face is formed on the lower end of the neck which will abut the bearing face on the thrust washer when the nut is tightened down. The lower end is staked outwardly to interfere with the lock ring so as to prevent the separation of the from the lock ring.

This invention will be fully understood from the following detailed description and accompanying drawings, in which:

DETAILED DESCRIPTION OF THE INVENTION

Figure 1:
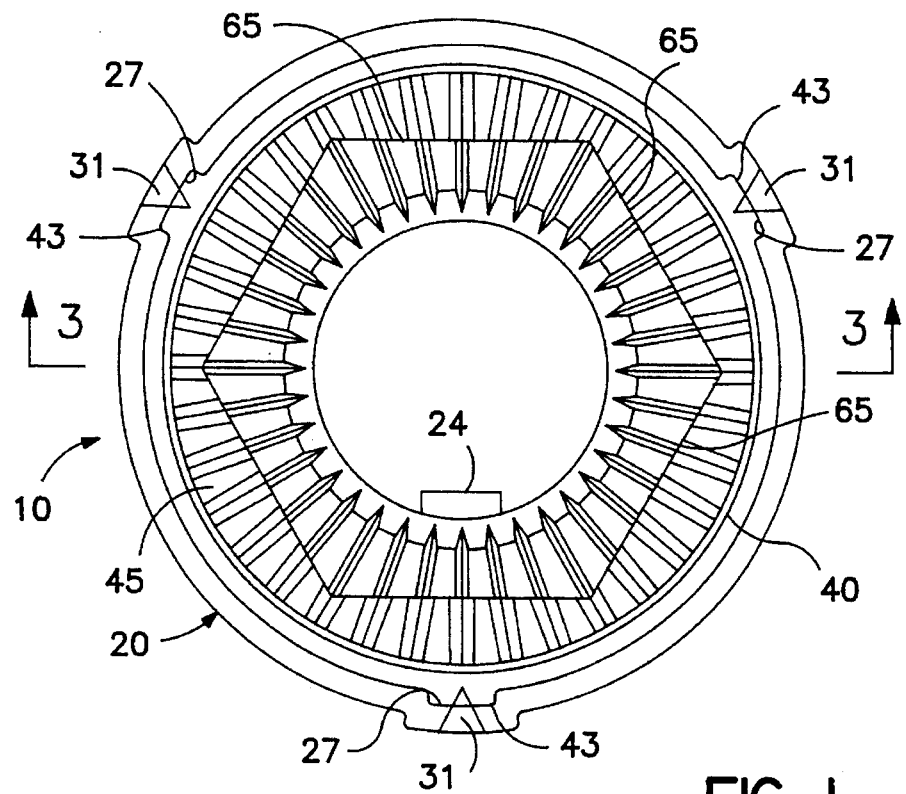
FIG. 1 is a top view of the presently-preferred embodiment of the invention.
Figure 2:
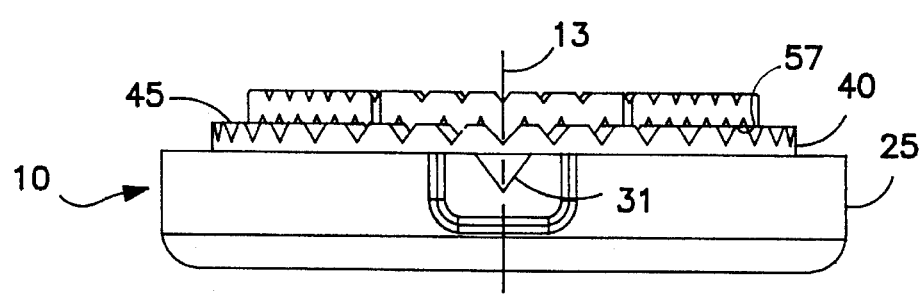
FIG. 2 is a side view, looking upwardly, in FIG. 1.

A self-locking nut 10 according to this invention is shown in FIGS. 1–5. Its function is to be threaded onto a shaft 11, and be brought to bear against a shoulder 12 on a body such as a wheel bearing. The shaft has a central axis 13 in common with the axis of the nut 10. The shaft further includes an axially-extending spline groove along and in its thread 15.

Nut 10 includes a cup-like thrust washer 20 having a lower abutment face 21 to bear against the shoulder 12, and an upper bearing face 22, both surrounding a central opening 23. A spline tang 24 projects into the opening to be engaged in the spline groove to prevent the thrust washer from turning.

The thrust washer further includes a peripheral wall 25 that forms a cup-like cavity 26 in the thrust washer. The wall includes a plurality of retention grooves 27, which are radial enlargements of the internal surface 28 of the wall. These extend axially to the upper end 29 of the wall. As will later be seen, when the nut is assembled, portions 31 will be staked over for a purpose to be described.

Bias means 35 comprising a resilient wave spring 36 is placed in the cavity where it will bear against bearing face 22.

A lock ring 40 has a lower abutment face 41 which bears against the bias means to compress it. The lock ring has a central opening 41a and a peripheral rim 42. A plurality of retention tangs 43 extend radially outward to fit in retention grooves 27. They are axially movable in the grooves, so the lock ring can be axially moved, but not rotatable therein. Staked-over portions 31 formed in the top of wall 25 keep the retention tangs in the grooves, thereby to hold the lock ring, bias means, and thrust washer against separation.

A series of radially-extending lock grooves 45 are formed in the upper face of the lock ring.

Figure 3:
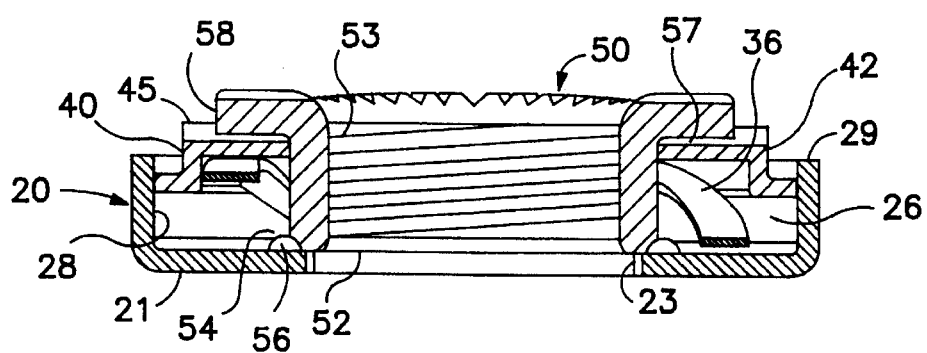
FIG. 3 is a cross-section taken at line 3—3 in FIG. 1.
Figure 4:
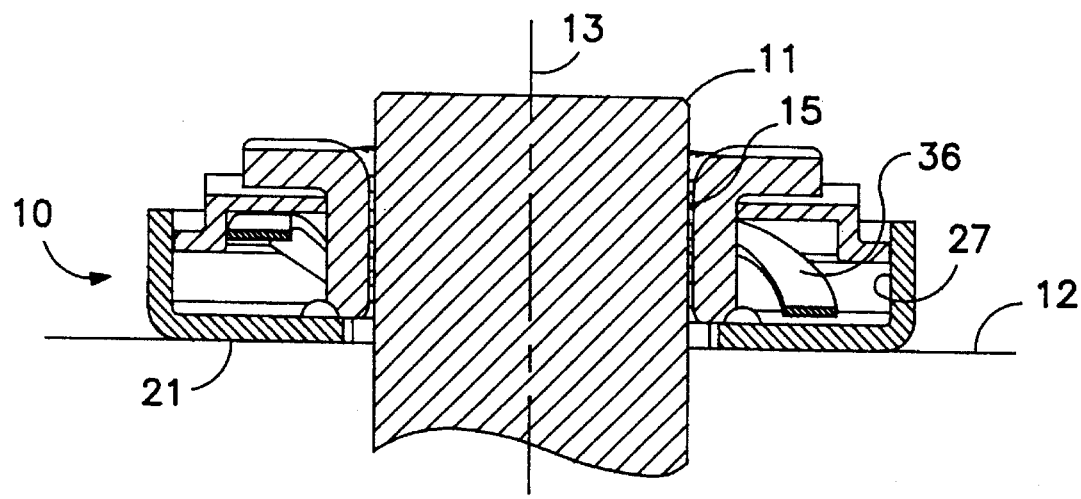
FIG. 4 is a view similar to FIG. 3, showing the nut installed.
Figure 5:
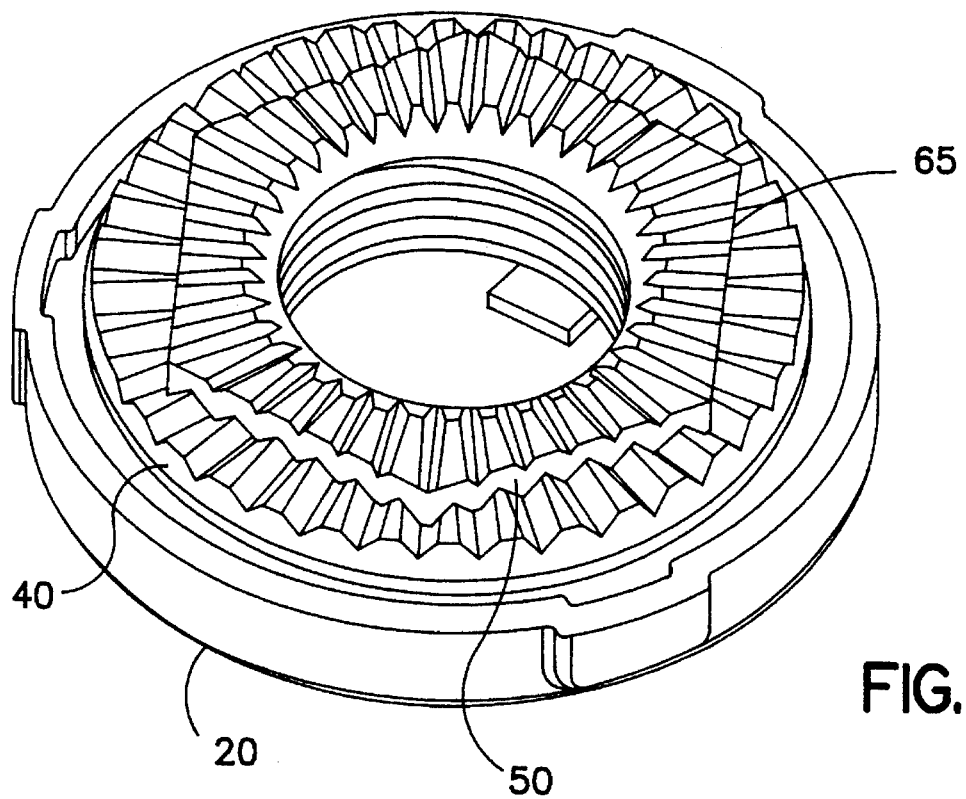
FIG. 5 is a perspective view further illustrating the invention.
Figure 6:
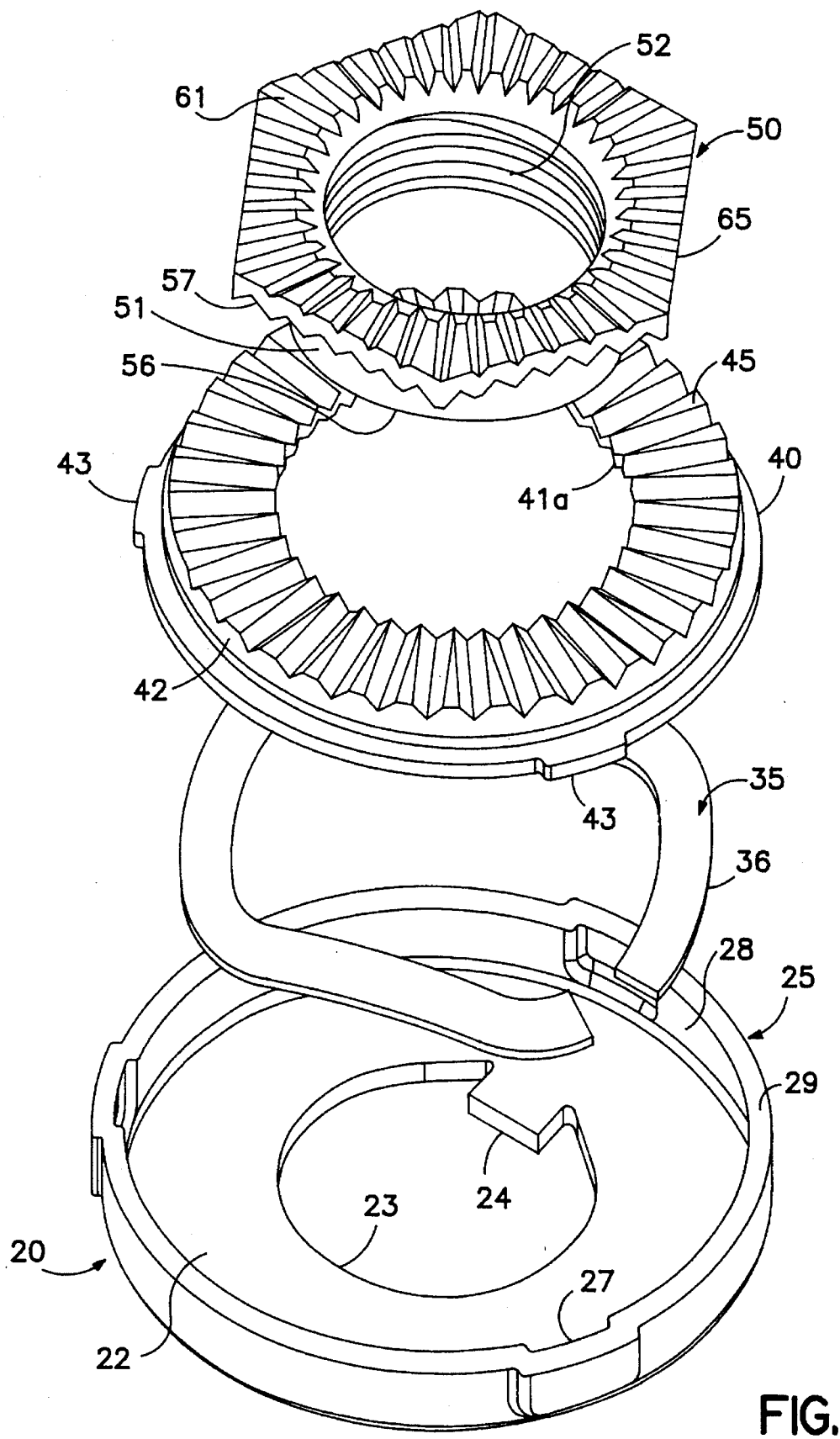
FIG. 6 is an exploded view of the device.

A nut 50 has a dependent neck 51. An internal thread 52 extends from end to end of a hole 53 through the nut. As best shown in FIG. 3, after the nut has been inserted through the opening in the lock ring, its lower end 54 will be staked outwardly to form a rim 54 which radially interferes with the lock ring at its opening, thereby to keep the nut to the lock ring, thereby enabling the device to be handled as a single unit that does not come apart. It also forms a bearing face 56 that abuts against bearing face 22 on the thrust washer to transfer axial force through the thrust washer to shoulder 12.

A plurality of radially extending locking grooves 57 are formed in the lower surface of a rim 58 on the nut. They face grooves 45 on the lock ring, and are engageable with them. These serrations are preferably dihedral angles. Their slope, and the coefficient of friction of their materials, are such that these serrations are locked when together, and cannot be cammed apart.

A waviness 61 shown on the upper end of nut 50 is not indicative of serrations or grooves. This is merely an accurate representation of the surface when the lower grooves are formed in a pressing operation.

An array of torquing surfaces 65 are formed on the top of nut 50 to be engaged by a torque tool. The tool (not shown) will include matching torquing surfaces, and a peripheral skirt which will contact some outer portions of the grooves on the lock ring to depress the lock ring and release the nut.

The installation and removal of this nut should be evident from the foregoing. The nut is placed over the end of the shaft, with the spline tang in the spline groove.

Here a significant advantage of the invention will become evident. The length of the neck on the nut is such that even with the lock ring at its uppermost extreme, the nut can be raised so its grooves clear those on the lock ring. This means that the nut can be freely spun onto the shaft even before a tool is applied. This is a considerable saving of the installer's time. Only after the nut closely approaches the lock ring it will be necessary to apply a tool to complete the installation.

For this latter purpose a conventional hexagonal socket will be applied to the hexagonal drive forces. The peripheral skirt on the tool will bear against the upper face of the lock ring outside of the torquing surfaces and depress the lock ring so as to remove its serrations from those of the nut. Then, while maintaining an axial force on the nut, a torque is applied to tighten the nut against the bearing face of the thrust washer.

After a sufficient torque is applied, the tool will be removed. If the serrations are precisely aligned, they will be fully engaged. If they are not, the nut can be left as is, because if it backs off, it will be accurately aligned within a few degrees of angular movement. If preferred, the nut can be backed off, without depressing the lock ring, until the serrations are fully engaged.

This nut can be handled as a single piece, and initially run on by hand, both to the advantage of the installer. It is highly reliable and can be made of very strong material, employing conventional processes. It can be applied with conventional tooling.

Removal involves the reverse of the installation process.

This invention is not to be limited by the embodiment shown in the drawings and described in the description, which is given by way of example and not of limitation, but only in accordance with the scope of the appended claims.

I claim:

1. A self-locking nut for application to a shaft having a thread and an axially extending spline groove along its thread, said self-locking nut having a central axis, and comprising:

a thrust washer having a central opening to pass said shaft, a spline tang extending into said opening for engagement in said spline groove, an abutment face and an oppositely facing bearing face, a peripheral shoulder with an internal peripheral wall to form a cup-like cavity, a plurality of axially-extending retention grooves in said wall, and an upper edge spaced from said bearing face;

bias means;

a lock ring axially movable in said cavity having a central opening, a plurality of retention tangs so disposed and arranged as slidably to fit in said retention grooves, said upper edge being shaped to interfere with the removal of said retention tangs from said thrust washer, a bias face against which said bias means bears, and a plurality of radially extending lock grooves on a face oppositely directed from said bias face;

said bias means being disposed between said bias face and said bearing face to bias them apart;

a nut having an array of torque transmitting surfaces, a depending neck passing through the opening in the lock ring, a plurality of radially extending locking grooves on the lock ring facing the locking grooves on the lock ring, an internal thread for engagement with the thread on the shaft, and a bearing face adapted to be brought to bear against the bearing face of the thrust washer to exert an axial force to hold the self-locking nut firmly against a body beyond which said shaft projects, an end of said neck being shaped to form said bearing face, together with an outward deformation so proportioned as to prevent removal of the nut from the lock ring.

2. A self-locking nut according to claim 1 in which said upper edge of said peripheral wall is staked over the retention grooves to keep the lock ring from separating from said thrust washer.

3. A self-locking nut according to claim 1 in which said array projects axially above said lock ring, whereby a tool can be applied to said array to apply torque to said array, and simultaneously press on the lock ring to free the locking grooves of the nut and of the lock ring from each other to permit the nut to be tightened without obstruction by the lock ring.

4. A self-locking nut according to claim 1 in which said array of torque transmitting surfaces extends above and partially overhangs said lock grooves on said lock ring.

\* \* \* \* \*